(12) United States Patent
Mizuno et al.

(10) Patent No.: US 8,109,377 B2
(45) Date of Patent: Feb. 7, 2012

(54) CLUTCH DEVICE

(75) Inventors: Kinya Mizuno, Saitama (JP); Seiji Hamaoka, Saitama (JP); Eiji Kittaka, Saitama (JP); Kazuhiro Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 578 days.

(21) Appl. No.: 12/357,479

(22) Filed: Jan. 22, 2009

(65) Prior Publication Data

US 2009/0188765 A1 Jul. 30, 2009

(30) Foreign Application Priority Data

Jan. 24, 2008 (JP) ................... 2008-013358

(51) Int. Cl.
*F16D 11/00* (2006.01)
*F16D 13/60* (2006.01)
*F16D 25/0638* (2006.01)
*F16D 43/28* (2006.01)
*F16D 21/00* (2006.01)
*F16D 25/06* (2006.01)
*F16D 25/10* (2006.01)

(52) U.S. Cl. .............. 192/109 R; 192/85.42; 192/85.43; 192/48.611; 192/48.614

(58) Field of Classification Search ............ 74/330, 74/340; 192/109 R, 85.42, 85.43, 48.611, 192/48.614
See application file for complete search history.

(56) References Cited

U.S. PATENT DOCUMENTS

| 4,648,495 | A | * | 3/1987 | Vater et al. ................. 192/70.12 |
| 4,905,812 | A | * | 3/1990 | Shepperd ................. 192/113.36 |
| 5,527,229 | A | * | 6/1996 | Ishihara et al. ............... 475/249 |
| 5,709,130 | A | * | 1/1998 | Suzuki ............................ 74/378 |
| 5,755,314 | A | * | 5/1998 | Kanda et al. ............... 192/70.12 |
| 6,790,161 | B2 | * | 9/2004 | Yamasaki et al. ............. 477/181 |
| 2008/0023291 | A1 | * | 1/2008 | Sorani et al. ................. 192/87.1 |

FOREIGN PATENT DOCUMENTS

JP 2007-98983 A 4/2007

* cited by examiner

*Primary Examiner* — David D Le
*Assistant Examiner* — Michael Gonzalez
(74) *Attorney, Agent, or Firm* — Birch, Stewart, Kolasch & Birch, LLP (57) ABSTRACT

In a clutch device wherein a plurality of clutch plates are relatively non-rotatably engaged with a clutch outer, a plurality of clutch disks disposed alternately with the clutch plates are relatively non-rotatably engaged with a clutch inner, and an end plate disposed so that the clutch plates and the clutch disks are disposed between itself and a piston slidably fitted in the clutch outer is relatively non-rotatably and axially movably supported on the clutch outer in the manner of being restricted in movement toward one end side in the axial direction, to prevent the clutch inner from coming out of position at the time of assembling the clutch device into position, thereby to enhance workability in the assembling operation, and to prevent the clutch inner from generating a collision sound by colliding against other member than the component members of the clutch device when the clutch is disengaged.

20 Claims, 4 Drawing Sheets

CLUTCH DEVICE

CROSS-REFERENCE TO RELATED APPLICATIONS

The present application claims priority under 35 USC 119 to Japanese Patent Application No. 2008-013358 filed on Jan. 24, 2008 the entire contents of which are hereby incorporated by reference.

BACKGROUND OF THE INVENTION

1. Field of the Invention

The present invention relates to a clutch device including a clutch outer relatively non-rotatably supported on a cylindrical boss which is rotatably borne on a clutch support shaft in the state of being restricted in axial movement and to which rotating motive power from a motive power source is transmitted. A clutch inner is axially movably and relatively non-rotatably connected to a transmission shaft which is disposed coaxially with the clutch support shaft. A plurality of clutch plates relatively non-rotatably engaged with the clutch outer with a plurality of clutch disks disposed alternately with the clutch plates and relatively non-rotatably engaged with the clutch inner. An end plate is relatively non-rotatably and axially movably supported on the clutch outer in such a manner so as to face the clutch plate or the clutch disk on one end side in the axial direction of the clutch support shaft and the transmission shaft, of the clutch plates and the clutch disks stacked on each other, and to be restricted in movement toward the one end side in the axial direction. A piston is slidably fitted in the clutch outer in such a manner so as to be able to push the clutch plates and the clutch disks toward the side of the end plate.

2. Description of Background Art

Such a clutch device as described above is known, as disclosed in Japanese Patent Laid-open No. 2007-98983.

In the clutch device disclosed in Japanese Patent Laid-open No. 2007-98983, however, the clutch inner that is axially movably and relatively non-rotatably connected to the transmission shaft is disposed between a ball bearing, which is interposed between a crankcase of an engine and a transmission shaft, and the clutch outer, and movement of the clutch inner to the side away from the clutch outer is not restricted. Therefore, at the time of assembling the clutch into position, the worker must carry out the assembling operation while preventing the clutch inner from coming out of position to be disengaged from the clutch plate, which makes the assembling operation troublesome. In addition, when the clutch inner has come out of position, the assembling operation must be again carried out. Thus, the clutch device of this type cannot be said to be excellent in workability. Furthermore, when the clutch is disengaged, the clutch inner may collide against a member adjacent to the clutch inner, thereby generating a collision sound.

SUMMARY AND OBJECTS OF THE INVENTION

The present invention has been made in consideration of the above-mentioned circumstances. Accordingly, it is an object of the present invention to provide a clutch device wherein it is possible to enhance the workability in an assembling operation by preventing a clutch inner from coming out of position at the time of assembling and it is possible to prevent the clutch inner from generating a collision sound by colliding against another member than the component members of the clutch device when the clutch is disengaged.

According to an embodiment of the present invention, a clutch device includes a clutch outer relatively non-rotatably supported on a cylindrical boss which is rotatably borne on a clutch support shaft in the state of being restricted in axial movement and to which a rotating motive power from a motive power source is transmitted. A clutch inner is axially movably and relatively non-rotatably connected to a transmission shaft which is disposed coaxially with the clutch support shaft. A plurality of clutch plates are relatively non-rotatably engaged with the clutch outer with a plurality of clutch disks disposed alternately with the clutch plates and relatively non-rotatably engaged with the clutch inner. An end plate is relatively non-rotatably and axially movably supported on the clutch outer in such a manner so as to face the clutch plate or the clutch disk on one end side in the axial direction of the clutch support shaft and the transmission shaft, of the clutch plates with the clutch disks overlapping with each other, and to be restricted in movement toward the one end side in the axial direction. A piston is slidably fitted in the clutch outer in such a manner so as to be able to push the clutch plates and the clutch disks toward the side of the end plate. The end plate is provided with a restricting part for restricting the movement of the clutch inner toward the one end side in the axial direction.

According to an embodiment of the present invention, the transmission shaft which is disposed between an annular projected part provided in the clutch support shaft and the boss and which coaxially surrounds the clutch support shaft is axially movably and relatively rotatably borne on the clutch support shaft, the clutch outer is provided with an inner cylinder part which surrounds the boss in an axially movable and relatively non-rotatable condition and of which an end face on the one end side in the axial direction is set to be substantially flush with an end face of the boss. A wave washer for producing spring forces in mutually separating-apart orientations is interposed between the inner cylinder part and the boss, and the transmission shaft and the clutch inner.

In addition, a first main shaft 20 in one embodiment corresponds to the clutch support shaft in the present invention, a second main shaft 21 in the embodiment to the transmission shaft in the invention, a second outer 68 in the embodiment to the clutch outer in the invention, a second clutch inner 69 in the embodiment to the clutch inner in the invention, second clutch plates 70 to the clutch plates in the invention, second clutch disks 71 in the embodiment to the clutch disks in the invention, a second end plate 72 in the embodiment to the end plate in the invention, a second piston 73 in the embodiment to the piston in the invention, a second wave washer 82 in the embodiment to the wave washer in the invention, and an engine E in the embodiment corresponds to the motive power source in the present invention.

According to an embodiment of the present invention, the end plate is relatively non-rotatably and axially movably supported on the clutch outer in such a manner so as to be restricted in movement toward the one end side in the axial direction of the clutch support shaft and the transmission shaft is provided with the restricting part for restricting the movement of the clutch inner toward the one end side in the axial direction. Therefore, at the time of assembling the clutch device into position, a worker can prevent the clutch inner from coming out of position, without paying any special attention, so that the workability in the assembling operation can be enhanced. In addition, when the clutch is disengaged, the clutch inner can be prevented from colliding with a member adjacent to the clutch inner on the one end side in the axial direction to generate a collision sound.

According to an embodiment of the present invention, the spring force produced by the wave washer makes it possible to keep the clutch inner in normal contact with the restricting part of the end plate, so that the clutch inner can be prevented from colliding against the restricting part of the end plate to generate a collision sound.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, a mode of carrying out the present invention will be described below, based on one embodiment of the present invention shown in the attached drawings.

Figure 1:
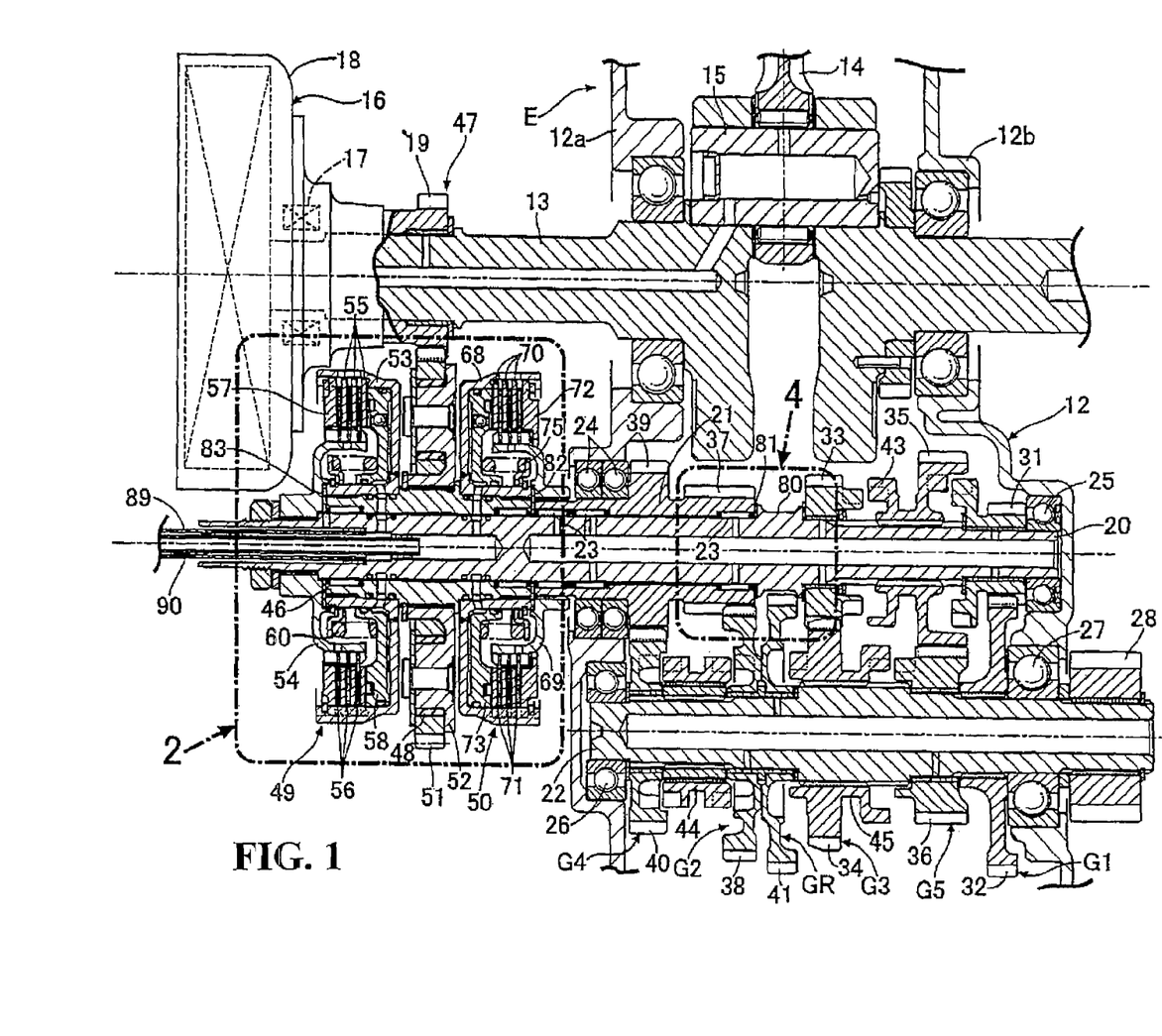
FIG. 1 is an essential part sectional view of an engine.

FIGS. 1 to 5 show one embodiment of the present invention. As illustrated in FIG. 1, a crankshaft 13 is rotatably borne on a crankcase 12 constituting a part of an engine body of an engine E mounted on a vehicle as a motive power source, and a connecting rod 14 connected to a piston (not shown) is connected to the crankshaft 13 through a crank pin 15.

The crankcase 12 includes first and second case halves 12*a* and 12*b* which are coupled at a plane orthogonal to the rotational axis of the crankshaft 13. A centrifugal clutch 16 is mounted, through a one-way clutch 17, to that end part of the crankshaft 13 which protrudes from the first case half 12*a* of the crankcase 12. A clutch housing 18 possessed by the centrifugal clutch 16 is relatively rotatably mounted to the crankshaft 13, and the clutch housing 18 is provided with a drive gear 19.

On the other hand, a first main shaft 20 as a clutch support shaft and a second main shaft 21 as a transmission shaft coaxially rotatable relative to the first main shaft 20 are mounted on the crankcase 12 so as to be rotatable about an axis parallel to the rotational axis of the crankshaft 13. In addition, a counter shaft 22 parallel to the first and second main shafts 20 and 21 is rotatably mounted on the crankcase 12.

The second main shaft 21 is formed in a tubular shape so as to coaxially surround an intermediate part of the first main shaft 20. A plurality of needle bearings 13 are interposed between the first and second main shafts 20 and 21, a pair of ball bearings 24, 24 are interposed between the first case half 12*a* of the crankcase 12 and the second main shaft 21 and a ball bearing 25 is interposed between the second case half 12*b* and the first main shaft 20. In addition, a ball bearing 26 is interposed between one end part of the counter shaft 22 rotatably penetrating the second case half 12*b* and the first case half 12*a*, a ball bearing 27 is interposed between the counter shaft 22 and the second case half 12*b* and an output gear 28 is fixed to an end part of the counter shaft 22 which protrudes from the second case half 12*b*.

A 1st speed gear train G1, a 3rd speed gear train G3 and a 5th speed gear train G5 which can be established selectively are provided between the first main shaft 20 and the counter shaft 22. A 2nd speed gear train G2, a 4th speed gear train G4 and a reverse gear train GR which can be established selectively are provided between the second main shaft 21 and the counter shaft 22.

The 1st speed gear train G1 is composed of a 1st speed drive gear 31 relatively rotatably mounted on the first main shaft 20 and a 1st speed driven gear 32 fixed to the counter shaft 22 and meshed with the 1st speed drive gear 31. The 3rd speed gear train G3 is composed of a 3rd speed drive gear 33 relatively rotatably mounted on the first main shaft 20 and a 3rd speed driven gear 34 relatively non-rotatably borne on the counter shaft 22 so as to be axially movable within a limited range. The 3rd speed driven gear 34 is capable of being meshed with the 3rd speed drive gear 33. The 5th speed gear train G5 is composed of a 5th speed drive gear 35 relatively non-rotatably borne on the first main shaft 20 so as to be axial movable within a limited range and a 5th speed driven gear 36 relatively rotatably borne on the first main shaft 22.

In addition, the 2nd speed gear train G2 is composed of a 2nd speed drive gear 37 provided as one body with the second main shaft 21 and a 2nd speed driven gear 38 rotatably borne on the counter shaft 22 and meshed with the 2nd speed drive gear 37. The 4th speed gear train G4 is composed of a 4th speed drive gear 39 provided as one body with the second main shaft 21 and a 4th speed driven gear 40 relatively rotatably borne on the counter shaft 22 and meshed with the 4th speed drive gear 39. The reverse gear train GR is composed of the 2nd speed drive gear 37 and a reverse driven gear 41 relatively rotatably borne on the counter shaft 22 and being in conjunction and connection with the 2nd speed drive gear 37 through a plurality of intermediate gears (not shown).

A first shifter 43 integrally provided with the 5th speed drive gear 35 is spline connected to the first main shaft 20, between the 1st and 3rd speed drive gears 31 and 33. The first shifter 43 is movable in the axial direction of the first main shaft 20 while being switched among a position for engaging with the 1st speed drive gear 31 to establish the 1st speed gear train G1, a position for engagement with the 3rd speed drive gear 33, and an intermediate position for engagement with neither of the 1st and 3rd speed drive gears 31, 33. In addition, a second shifter 44 is borne on the counter shaft 22 between the 2nd speed driven gear 38 and the 4th speed driven gear 40 so as to be relatively non-rotatable while being axially movable within a limited range. The second shifter 44 is movable in the axial direction of the counter shaft 22 while being switched among a position for engaging with the 2nd speed driven gear 38 to establish the 2nd speed gear train G2, a position for engaging with the 4th speed driven gear 40 to establish the 4th speed gear train G4, and an intermediate position for engagement with neither of the 2nd and 4th speed driven gears 38, 40. Further, a third shifter 45 integrally provided with the 3rd speed driven gear 34 is borne on the counter shaft 22 between the 5th speed driven gear 36 and the reverse driven gear 41 so as to be relatively non-rotatable while being axially movable within a limited range. The third shifter 45 is movable in the axial direction of the counter shaft 22 while being switched among a position for engagement with the 5th speed driven gear 36, a position for engagement with the reverse driven gear 41, and an intermediate position for engagement with neither of the 5th speed driven gear 36 and the reverse driven gear 41.

The first to third shifters 43 to 45 are moved by turning of a shift drum (not shown). The 1st speed gear train G1 is established by setting the second and third shifters 44 and 45 into the intermediate positions and engaging the first shifter 43 with the 1st speed drive gear 31, the 2nd speed gear train G2 is established by setting the first and third shifters 43 and 45 into the intermediate positions and engaging the second shifter 44 with the 2nd speed driven gear 38, the 3rd speed gear train G3 is established by setting the second and third shifters 44 and 45 into the intermediate positions and engaging the first shifter 43 with the 3rd speed drive gear 33, the 4th speed gear train G4 is established by setting the first and third shifters 43 and 45 into the intermediate positions and engaging the second shifter 44 with the 4th speed driven gear 40, the 5th speed gear train G5 is established by setting the first and second shifters 43 and 44 into the intermediate positions and engaging the third shifter 45 with the 5th speed driven gear 36 and the reverse gear train GR is established by setting the first and second shifters 43 and 44 into the intermediate positions and engaging the third shifter 45 with the reverse driven gear 41. When the first to third shifters 43 to 45 are all set into the intermediate positions, a neutral condition is obtained in which none of the 1st to 5th speed gear trains G1 to G5 and the reverse gear train GR is established.

A cylindrical boss 46 coaxially surrounding the first main shaft 20 is borne on the first main shaft 20, at a part of the latter protruding from the first case half 12a of the crankcase 12, so as to be relatively rotatable while being restricted in axial movement. The rotating motive power of the engine E, i.e., the rotating motive power of the crankshaft 13, is transmitted to the boss 46 through the one-way clutch 17, the centrifugal clutch 16, a primary speed reduction gear 47 and a rubber damper 48. A first clutch 49 is provided between the boss 46 and the first main shaft 20, and a second clutch 50 is provided between the boss 46 and the second main shaft 21.

Figure 2:
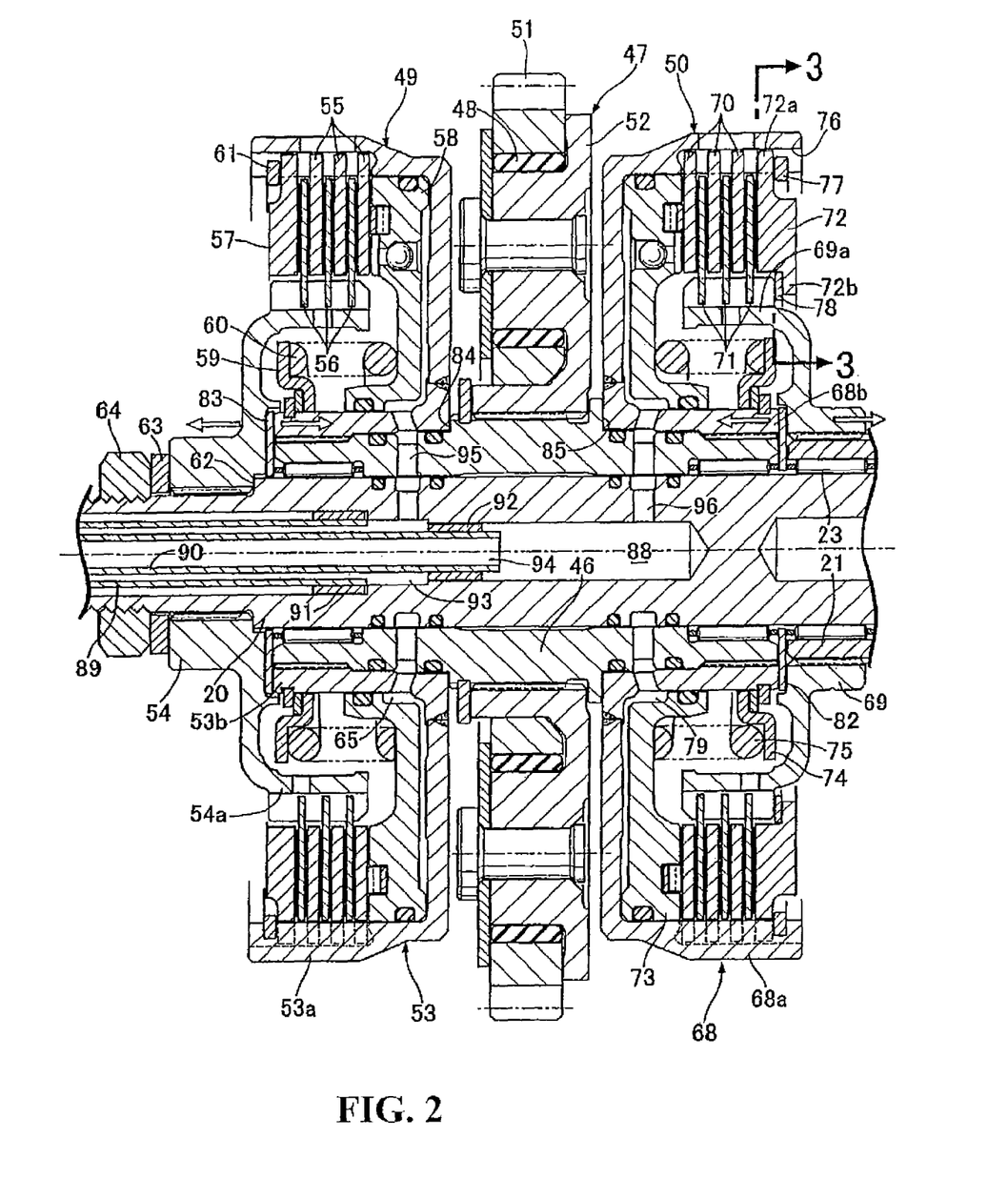
FIG. 2 is an enlarged view of apart indicated by arrow 2 of FIG. 1.

In FIG. 2, the primary speed reduction gear 47 includes the drive gear 19, and a driven gear 51 meshed with the drive gear 19 while being rotatable coaxially with the first main shaft 20. In addition, a gear support member 52 is fixed to an intermediate part in the axial direction of the boss 46, and the driven gear 52 is borne on the gear support member 52 through the rubber damper 48.

The first clutch 49 and the second clutch 50 are disposed with the gear support member 52 located therebetween so that the second clutch 50 is disposed between the first case half 12a of the crankcase 12 and the gear support member 52.

The first clutch 49 includes a first clutch outer 53 fixed to the boss 46 while being formed in the shape of a bottomed double cylinder which has an inner cylinder part 53a coaxially surrounding the boss 46 and an outer cylinder part 53b coaxially surrounding the inner cylinder part 53a and which is closed at one end part on the side of the gear support member 52 and a first clutch inner 54 fixed to the first main shaft 20 while having a first cylinder part 54a coaxially inserted into the space between the inner cylinder part 53a and the outer cylinder part 53b of the first clutch outer 53 from the other end, or an open end, of the first clutch outer 53. A plurality of first clutch plates 55 are provided that are relatively non-rotatably engaged with the outer cylinder part 53b of the first clutch outer 53 with a plurality of first clutch disks 56 which are relatively n-on-rotatably engaged with the first cylinder part 54a of the first clutch inner 54 and which are disposed alternately with the first clutch plates 55. A first end plate 57 is relatively non-rotatably engaged with the outer cylinder part 53b of the first clutch outer 53 in the state of facing the first clutch plate 55 or the first clutch disk 56 (in this embodiment, the first clutch disk 56) which is disposed at an end part on the side of the other end, or the open end, of the first clutch outer 53, of the first clutch plates 55 and the first clutch disks 56 disposed to overlap with each other. A ring-shaped first piston 58 is mounted, in a liquid-tight and slidable manner, to the inner cylinder part 53a and the outer cylinder part 53b so that the first clutch plates 55 and the first clutch disks 56 are located between the first end plate 57 and the first piston 58; and a first clutch spring 60 disposed in a contracted state between a first retainer 59, which is engaged with the inner cylinder part 53a of the first clutch outer 53, and the first piston 58.

A first stop ring 61 engaged with the first end plate 57 is fitted in the inner periphery of the outer cylinder part 53a on the side of an open end of the first clutch outer 53. The first stop ring 61 restricts the movement of the first end plate 57 toward the side of the other end, or the open end, of the first clutch outer 53.

In addition, the inner peripheral part of the first clutch inner 54 is spline engaged with the first main shaft 20 so that its one end makes contact with an annular stepped part 62 possessed by the first main shaft 20. A bolt 64 is screw engaged with the first main shaft 20, with a washer 63 interposed between the bolt 64 and the other end of the inner peripheral part of the first clutch inner 54. By tightening the bolt 64, the first clutch inner 54 is fixed to the first main shaft 20.

A first hydraulic pressure chamber 65 is formed between one end, or a closed end, of the first clutch outer 53, and the above-mentioned first clutch spring 60 produces a spring force for urging the first piston 58 toward the side for increasing the inside volume of the first hydraulic pressure chamber 65. When a hydraulic pressure is exerted in the first hydraulic pressure chamber 65, the first piston 58 is moved, against the spring force of the first clutch spring 60, toward the side for clamping the first clutch plates 55 and the first clutch disks 56 between itself and the first end plate 57. As a result, the first clutch plates 55 and the first clutch disks 56 are put into frictional engagement with each other, whereby motive power is transmitted between the first clutch outer 53 and the first clutch inner 54, i.e., between the boss 46 and the first main shaft 20.

The second clutch 50, configured according to the present invention, includes a second clutch outer 68 fixed to the boss 46 while being formed in the shape of a bottomed double cylinder which has an inner cylinder part 68a surrounding the boss 46 and an outer cylinder part 68b coaxially surrounding the inner cylinder part 68a, which is opened at one end on the opposite side of the gear support part 52, and which is closed at the other end part on the side of the gear support member 52 and a second clutch inner 69 fixed to the second main shaft 21 while having a second cylinder part 69a coaxially inserted into the space between the inner cylinder part 68a and the outer cylinder part 68b of the second clutch outer 68 from the side of one end, or an open end, of the second clutch outer 68; a plurality of second clutch plates 70 relatively non-rotatably engaged with the outer cylinder part 68b of the second clutch outer 68; a plurality of second clutch disks 71 which are relatively non-rotatably engaged with the second cylinder part 69a of the second clutch inner 69 and which are disposed alternately with the second clutch plates 70. A second end plate 72 is provided that is relatively non-rotatably engaged with the outer cylinder part 68b of the second clutch outer 68 while facing the second clutch plate 70 or the second clutch disk 71 (in this embodiment, the second clutch disk 71) which is disposed at an end part on the side of one end, or an open end, of the second clutch outer 68, of the second clutch plates 70 and the second clutch disks 71 disposed so as to overlap with each other. A ring-shaped second piston 73 is fitted, in a liquid-tight and slidable manner, in the space between the inner cylinder part 68a and the outer cylinder part 68b of the second clutch outer 68 so that the second clutch plates 70 and the second clutch disks 71 are located between itself and the second end plate 72 and a second clutch spring 75 disposed in a contracted state between a second retainer 74, which is engaged with the inner cylinder part 68a of the second clutch outer 68, and the second piston 73.

Figure 3:
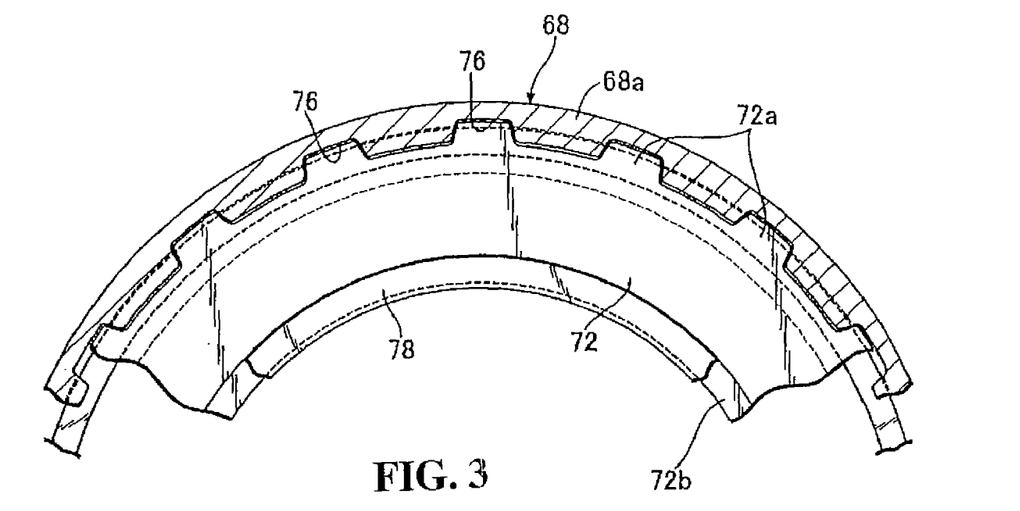
FIG. 3 is an enlarged sectional view taken along line 3-3 of FIG. 2.

Referring to FIG. 3 also, the outer cylinder part 53a of the second clutch outer 53 is provided in its inside surface with a plurality of lock recesses 76, 76 extending in the axial direction, and the outer peripheries of the second clutch plates 70 are engaged with the lock recesses 76, 76. In addition, the second end plate 72 is integrally provided at its outer periphery with a plurality of engaging projections 72a, 72a for engagement with the lock recesses 76, 76. A second stop ring 77 for engagement with the second end plate 72 is fitted in the inner periphery of one end part of the outer cylinder part 53 on the side of the open end of the second clutch outer 53. By the second stop ring 77, movement of the second end plate 72 toward the side of one end, or the open end, of the second clutch outer 53.

In addition, the second end plate 72 is provided with a restricting part 72b for restricting the movement of the second clutch inner 69 toward the one end side in the axial direction of the second clutch outer 68. The restricting part 72b is provided as one body with the second end plate 72 while being formed in the shape of a flange extending radially inwards from the inner circumference of the second end plate 72. The restricting part 72b is put in contact with one end part of the second cylinder part 69a of the second clutch inner 69 through a ring-shaped thrust washer 78.

A second hydraulic pressure chamber 79 is formed between the closed end of the second clutch outer 68 of the second clutch 50 and the second piston 73, and the second clutch spring 68 produces a spring force for urging the second piston 73 toward the side for increasing the inside volume of the second hydraulic pressure chamber 79. When a hydraulic pressure is exerted in the second hydraulic pressure chamber 79, the second piston 73 is moved, against the spring force of the second clutch spring 68, toward the side for clamping the second clutch plates 70 and the second clutch disks 71 between itself and the second end plate 72. As a result, the second clutch plates 70 and the second clutch disks 71 are put into frictional engagement with each other, whereby motive power is transmitted between the second clutch outer 68 and the second clutch inner 69, i.e., between the boss 46 and the second main shaft 21.

Figure 4:
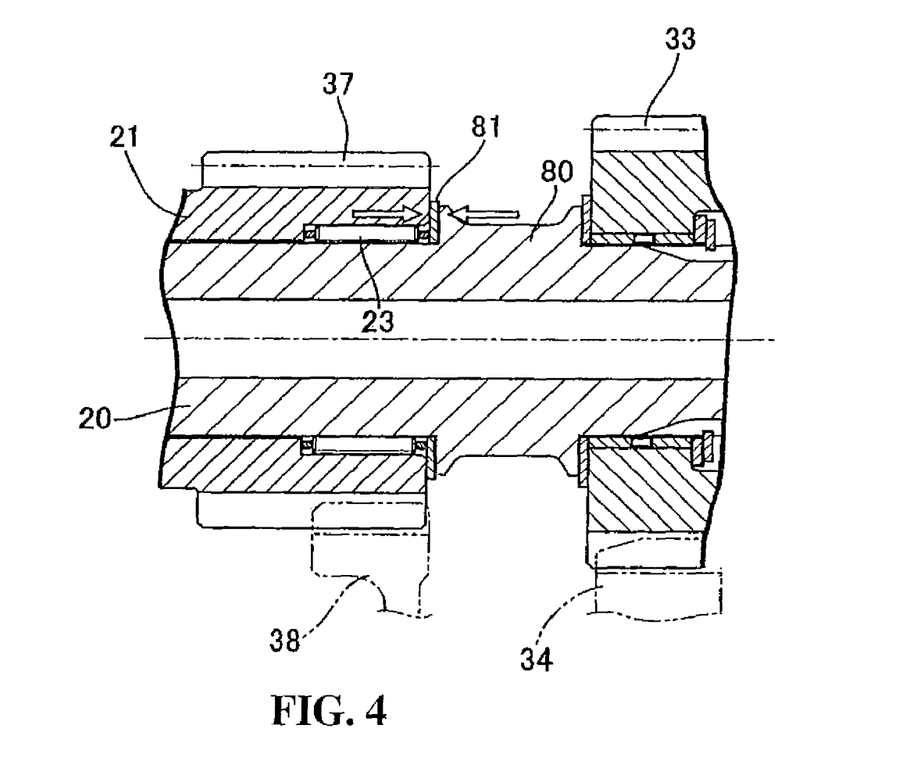
FIG. 4 is an enlarged view of a part indicated by arrow 4 of FIG. 1.

Referring to FIG. 4 also, the first main shaft 20 is integrally provided at its intermediate part with an annular projected part 80. A second main shaft 21 disposed between the annular projected part 80 and the boss 46 and surrounding the first main shaft 20 is relatively rotatably borne on the first main shaft 20 so as to be relatively movable in the axial direction of the first main shaft 20. Moreover, a first wave washer 81 producing a spring force for urging the second main shaft 21 toward the other end side in the axial direction is interposed between the annular projected part 80 and one end of the second main shaft 21.

Again in FIG. 2, an inner peripheral part of the second clutch inner 69 is spline engaged with the other end part of the second main shaft 21, resulting in that the second clutch inner 69 is axially movably and relatively non-rotatably connected to the second main shaft 21.

In addition, the inner cylinder part 68b of the second clutch outer 68 is disposed so that it surrounds the boss 46 and its end face on the one end side in the axial direction is substantially flush with an end face of the boss 46, and the boss 46 is provided with an annular stepped part 85 on which the other end of the inner cylinder part 68b abuts. Besides, a second wave washer 82 producing spring forces in mutually separating-apart orientations is interposed between the inner cylinder part 68b of the second clutch outer 68 and the boss 46, and the second main shaft 21 and the second clutch inner 69. By the second wave washer 82, the second main shaft 21 is urged toward the side of the annular projected part 80, the second clutch inner 69 is urged toward the side of one end, or an open end, in the axial direction of the second clutch outer 68, the second clutch outer 68 is urged toward the side for bringing its inner cylinder part 68b into contact with the annular stepped part 85 of the boss 46, and the boss 46 is urged toward the side of the first clutch inner 54 of the first clutch 49.

Furthermore, the boss 46 is provided with an annular stepped part 84 on which the inner cylinder part 53b of the first clutch outer 53 of the first clutch 49 is abutted on the side of the closed end, or one end, of the first clutch outer 53. The other end face of the inner cylinder part 53b and the other end face of the boss 46 are disposed at substantially the same position in the axial direction. A third wave washer 83 producing spring forces for urging the inner cylinder part 53b of the first clutch outer 53 in the direction for abutting on the annular stepped part 84 and urging the boss 46 in the direction for spacing away from the inner cylinder part of the first clutch inner 54 is interposed between the inner cylinder part of the first clutch inner 54 fixed to the first main shaft 20, and the inner cylinder part 53b and the boss 46.

More specifically, the second main shaft 21 with the first wave washer 81 interposed between itself and the annular projected part 80 and the boss 46 with the second wave washer 82 interposed between itself and the second main shaft 21 and with the third wave washer 83 interposed between itself and the first clutch inner 54 are disposed in series between the annular stepped part 80 of the first main shaft 20 and the first clutch inner 54 fixed to the first main shaft 20. By the functions of the first to third wave washers 81 to 83, the second main shaft 21 and the boss 46 are prevented from chattering in the direction along the axial direction of the first main shaft 20. In addition, the first and second clutch outers 53 and 68 are pressed against the annular stepped parts 84 and 85 of the boss 46 by the spring forces produced by the second and third wave washers 82 and 83, whereby the first and second clutch outers 53 and 68 are prevented from chattering in the direction along the axial direction of the boss 46. Therefore, chattering of the second main shaft 21 and the boss 46 in the direction along the axial direction of the first main shaft 20 and chattering of the first and second clutch outers 53 and 68 in the direction along the axial direction of the boss 46 are prevented. As a result, play sounds are prevented from being generated inside the first and second clutches 49, 50.

Again in FIG. 2, the first main shaft 20 is coaxially provided therein with a bottomed center hole 88 opening on the other end side thereof so that the closed end of the center hole 88 corresponds to the second clutch 50. An outer cylinder member 89 and an inner cylinder member 90 coaxially disposed inside the outer cylinder member 89 are coaxially inserted in the center hole 88, and the inner end of the inner cylinder member 90 is extended inwards in the center hole 88 beyond the inner end of the outer cylinder member 89.

Moreover, an annular seal member 91 is interposed between the outer periphery of an inner end part of the outer cylinder member 89 and the inner periphery of the center hole 88, and an annular seal member 92 is interposed between the outer periphery of an inner end part of the outer cylinder member 90 and the inner periphery of the center hole 88. An annular first oil passage 93 is formed between the outer cylinder member 89 and the inner cylinder member 90, and a second oil passage 94 isolated from the first oil passage 93 is formed inside the inner cylinder member 90.

A plurality of first communicating passages 95 communicating with the first hydraulic pressure chamber 65 in the first clutch 49 are provided over the range including the first main shaft 20, the boss 46 and the inner cylinder part 53a of the first clutch outer 53, and the first communicating passages 95 communicate with the first oil passage 93. In addition, a plurality of second communicating passages 96 communicating with the second hydraulic pressure chamber 79 in the second clutch 50 are provided over the range including the first main shaft 20, the boss 46 and the inner cylinder part 68a of the second clutch outer 68, and the second communicating passages 96 communicate with the second oil passage 94. The hydraulic pressures in the first and second oil passages 93, 94, i.e., the hydraulic pressures in the first and second hydraulic pressure chambers 65, 79 are individually controlled by a hydraulic pressure control unit (not shown).

When a hydraulic pressure is exerted in the first hydraulic pressure chamber 65 so that the first clutch 49 is thereby put in a motive power transmitting state and motive power is transmitted from the crankshaft 13 to the first main shaft 20, motive power is transmitted from the first main shaft 20 to the counter shaft 22 through an alternatively established one of the 1st, 3rd and 5th speed gear trains G1, G3, G5. When a hydraulic pressure is exerted in the second hydraulic pressure chamber 79 so that the second clutch 50 is thereby put in a motive power transmitting state and motive power is transmitted from the crankshaft 13 to the second main shaft 21, motive power is transmitted from the second main shaft 21 to the counter shaft 22 through an alternatively established one of the 2nd speed gear train G2, the 4th speed gear train G4 and the reverse gear train GR.

Now, the operation of this embodiment will be described below. In the second clutch 50, the second end plate 72 so disposed that the plurality of second clutch plates 70 and the plurality of second clutch disks 71 are alternately disposed between itself and the second piston 73 is relatively non-rotatably and axially movably supported on the second clutch outer 68 so as to be restricted in movement toward the side of one end in the axial direction of, or the side of the open end of, the second clutch outer 68. The second end plate 72 is provided with the restricting part 72b for restricting the movement of the second clutch inner 69 toward the one end side in the axial direction.

Therefore, when the second clutch 50 is disengaged, the second clutch inner 69 is prevented from generating a collision sound by colliding against a member adjacent to the second clutch inner 69 on one end side in the axial direction, i.e., against the ball bearing 24 in this embodiment.

Figure 5:
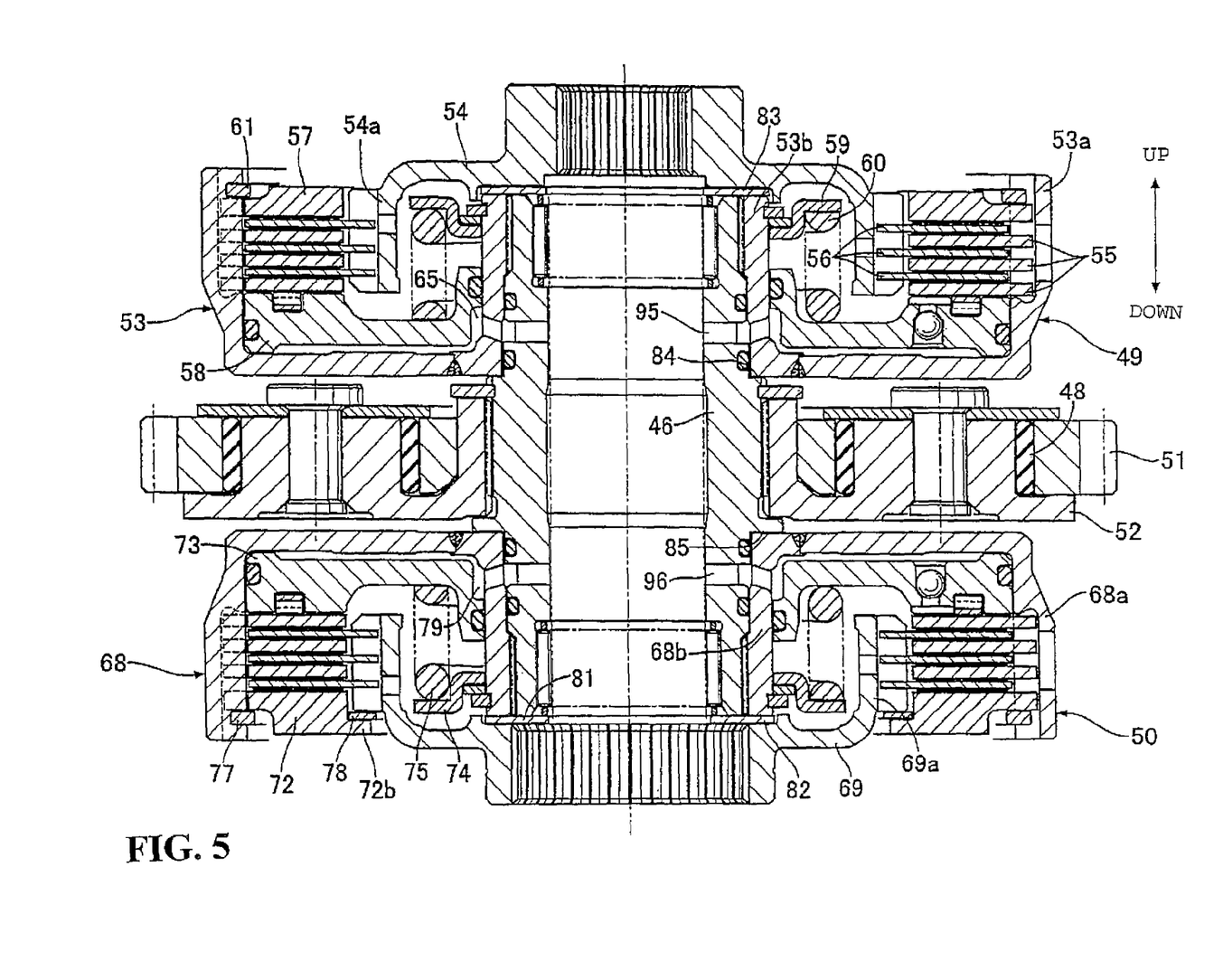
FIG. 5 is a sectional view showing a clutch device when the clutch device is assembled into position.

Meanwhile, as shown in FIG. 5, the second clutch 50 and the first clutch 49 in the state of being mounted together to the boss 46 are assembled onto the first main shaft 20, with the second clutch 50 on the lower side. In this case, the second clutch inner 69 of the second clutch 50 is restricted in movement toward the one end side in the axial direction, i.e., toward the lower side, by the restricting part 72b of the second end plate 72.

Therefore, at the time of assembling, the worker can prevent the second clutch inner 69 from coming downwards out of position, without paying any special attention. Thus, the workability in the assembling operation can be enhanced.

In addition, the second main shaft 21 which is disposed between the annular projected part 80 possessed by the first main shaft 20 and the boss 46 and which coaxially surrounds the first main shaft 20 is axially movably and relatively non-rotatably borne on the first main shaft 20. Besides, the second clutch outer 68 of the second clutch 50 is provided with the inner cylinder part 68b which surrounds the boss 46 while permitting axial movement and making relative rotation impossible and of which an end face on one end side in the axial direction is substantially flush with an end face of the boss 46. Further, the second wave washer 82 for producing spring forces in mutually separating-apart directions is interposed between the inner cylinder part 68b and the boss 46, and the second main shaft 21 and the second clutch inner 69. Therefore, by the spring forces produced by the second wave washer 82, the second clutch inner 69 can be kept in normal contact with the restricting part 72b of the second end plate 72, so that the second clutch inner 69 can be prevented from colliding against the restricting part 72b of the second end plate 72 to generate a collision sound.

While an embodiment of the present invention has been described, the invention is not to be construed as limited to the embodiment, and various design modifications can be made without departing from the scope of the invention as defined in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch device comprising:
   a clutch outer relatively non-rotatably supported on a cylindrical boss which is rotatably borne on a clutch support shaft in the state of being restricted in axial movement and to which rotating motive power from a motive power source is transmitted;
   a clutch inner axially movably and relatively non-rotatably connected to a transmission shaft which is disposed coaxially with said clutch support shaft;
   a plurality of clutch plates relatively non-rotatably engaged with said clutch outer;
   a plurality of clutch disks disposed alternately with said clutch plates and relatively non-rotatably engaged with said clutch inner;
   an end plate relatively non-rotatably and axially movably supported on said clutch outer in such a manner as to face said clutch plate or said clutch disk on one end side in an axial direction of said clutch support shaft and said transmission shaft, of said clutch plates and said clutch disks overlapping with each other, and to be restricted in movement toward said one end side in said axial direction; and
   a piston slidably fitted in said clutch outer in such a manner as to be able to push said clutch plates and said clutch disks toward the side of said end plate, wherein said end plate is provided with a restricting part for restricting the movement of said clutch inner toward said one end side in said axial direction.

2. The clutch device as set forth in claim 1, wherein said transmission shaft which is disposed between an annular projected part provided in said clutch support shaft and said boss and which coaxially surrounds said clutch support shaft is axially movably and relatively rotatably borne on said clutch support shaft, said clutch outer is provided with an inner cylinder part which surrounds said boss in an axially movable and relatively non-rotatable condition and of which an end face on said one end side in said axial direction is set to be substantially flush with an end face of said boss, and a wave washer producing a spring force in mutually separating-apart orientations is interposed between said inner cylinder part and said boss, and said transmission shaft and said clutch inner.

3. The clutch device as set forth in claim 1, wherein the clutch device comprises a first clutch and a second clutch, the first clutch and the second clutch each being provided with a gear support member being operatively disposed therebetween.

4. The clutch device as set forth in claim 3, wherein the first clutch includes an inner cylinder part coaxially surrounding the cylindrical boss and an outer cylinder part coaxially surrounding the inner cylinder part which is closed at one end part on a side of the gear support member.

5. The clutch device as set forth in claim 3, wherein the second clutch includes an inner cylinder part coaxially surrounding the cylindrical boss and an outer cylinder part coaxially surrounding the inner cylinder part which is closed at one end part on a side of the gear support member.

6. The clutch device as set forth in claim 1, and further including a clutch spring operatively positioned between a retainer engaged with an inner cylinder part of the outer clutch and the piston.

7. The clutch device as set forth in claim 1, wherein the clutch outer includes an outer cylinder part with an inside surface including a plurality of lock recesses extending in said axial direction wherein an outer peripheries of the clutch plates are engaged with the lock recesses.

8. The clutch device as set forth in claim 7, wherein the end plate is provided with a plurality of engaging projections for engagement with the lock recesses.

9. The clutch device as set forth in claim 1, and further including a stop ring operatively positioned for engagement with the end plate, said stop ring being fitted in an inner periphery of an end part of an outer cylinder part on the side of an open end of the clutch outer.

10. The clutch device as set forth in claim 1, wherein the restricting part is provided as one body with the end plate while being formed in the shape of a flange extending radially inwards from the inner circumference of the second end plate with the restricting part being place in contact with one end part of a cylinder part of a clutch inner through a ring-shaped thrust washer.

11. A clutch device comprising:
a clutch support shaft;
a cylindrical boss rotatably mounted on the clutch support shaft in the state of being restricted in axial movement and to which rotating motive power from a motive power source is transmitted;
a clutch outer adapted to be relatively non-rotatably supported on the cylindrical boss;
a transmission shaft disposed coaxially with said clutch support shaft;
a clutch inner adapted to be axially movably and relatively non-rotatably connected to the transmission shaft;
a plurality of clutch plates relatively non-rotatably engaged with said clutch outer;
a plurality of clutch disks disposed alternately with said clutch plates and relatively non-rotatably engaged with said clutch inner;
an end plate relatively non-rotatably and axially movably supported on said clutch outer to face said clutch plate or said clutch disk on one end side in an axial direction of said clutch support shaft and said transmission shaft, of said clutch plates and said clutch disks overlapping with each other, and to be restricted in movement toward said one end side in said axial direction; and
a piston slidably fitted in said clutch outer for selectively pushing said clutch plates and said clutch disks toward the side of said end plate, wherein said end plate is provided with a restricting part for restricting the movement of said clutch inner toward said one end side in said axial direction.

12. The clutch device as set forth in claim 11, wherein said transmission shaft is disposed between an annular projected part provided in said clutch support shaft and said boss and coaxially surrounds said clutch support shaft, said transmission shaft being axially movably and relatively rotatably borne on said clutch support shaft, said clutch outer is provided with an inner cylinder part which surrounds said boss in an axially movable and relatively non-rotatable condition and of which an end face on said one end side in said axial direction is set to be substantially flush with an end face of said boss, and a wave washer producing a spring force in mutually separating-apart orientations is interposed between said inner cylinder part and said boss, and said transmission shaft and said clutch inner.

13. The clutch device as set forth in claim 11, wherein the clutch device comprises a first clutch and a second clutch, the first clutch and the second clutch each being provided with a gear support member being operatively disposed therebetween.

14. The clutch device as set forth in claim 13, wherein the first clutch includes an inner cylinder part coaxially surrounding the cylindrical boss and an outer cylinder part coaxially surrounding the inner cylinder part which is closed at one end part on a side of the gear support member.

15. The clutch device as set forth in claim 13, wherein the second clutch includes an inner cylinder part coaxially surrounding the cylindrical boss and an outer cylinder part coaxially surrounding the inner cylinder part which is closed at one end part on a side of the gear support member.

16. The clutch device as set forth in claim 11, and further including a clutch spring operatively positioned between a retainer engaged with an inner cylinder part of the outer clutch and the piston.

17. The clutch device as set forth in claim 11, wherein the clutch outer includes an outer cylinder part with an inside surface including a plurality of lock recesses extending in said axial direction wherein an outer peripheries of the clutch plates are engaged with the lock recesses.

18. The clutch device as set forth in claim 17, wherein the end plate is provided with a plurality of engaging projections for engagement with the lock recesses.

19. The clutch device as set forth in claim 11, and further including a stop ring operatively positioned for engagement with the end plate, said stop ring being fitted in an inner periphery of an end part of an outer cylinder part on the side of an open end of the clutch outer.

20. The clutch device as set forth in claim 11, wherein the restricting part is provided as one body with the end plate while being formed in the shape of a flange extending radially inwards from the inner circumference of the second end plate with the restricting part being place in contact with one end part of a cylinder part of a clutch inner through a ring-shaped thrust washer.

* * * * *